(12) United States Patent
Miller

(10) Patent No.: US 6,538,524 B1
(45) Date of Patent: Mar. 25, 2003

(54) USING ELECTRICALLY LOSSY TRANSMISSION SYSTEMS TO REDUCE COMPUTER RF EMISSIONS

(75) Inventor: Edward C. Miller, Los Gatos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/537,382

(22) Filed: Mar. 29, 2000

(51) Int. Cl.[7] ............................................. H04B 3/28
(52) U.S. Cl. ................................. 333/12; 333/243
(58) Field of Search ........................ 333/12, 206, 243

(56) References Cited

U.S. PATENT DOCUMENTS

| | | | |
|---|---|---|---|
| RE29,018 E | 10/1976 | Garuts | 333/81 A |
| 4,146,854 A | * 3/1979 | Ishino et al. | 333/12 |
| 4,241,829 A | 12/1980 | Hardy | 206/328 |
| 4,889,750 A | 12/1989 | Wiley | 428/34.2 |
| 4,990,858 A | * 2/1991 | Garner | 324/639 |
| 4,992,060 A | * 2/1991 | Meyer | |

* cited by examiner

*Primary Examiner*—Robert Pascal
*Assistant Examiner*—Kimberly Glenn

(57) ABSTRACT

A computer system employs electrically lossy transmission systems to dissipate RF energy, and thus reduce RF emissions near the source. An electrically lossy dielectric includes a colloidal dispersion of lossy material, e.g., graphite, in a polymer matrix. A layer of this material can be placed in contact with a conductor or with its surrounding dielectric. A metal layer contacts the other side of the lossy dielectric so that an electrically lossy transmission system is defined. Such transmission systems are defined with respect to signal conductors, shields for coaxial cables, PCB boards, and structural metal, such as heat sinks and vent openings, etc. In some cases, impedance mismatches are used to reflect unwanted energy back through or back and forth through the lossy transmission system. The lossy transmission systems dissipate RF energy so that there is less RF energy to radiate to the computer's exterior. When used in conjunction with known RF shielding techniques, the lossy transmission systems provide for reduced RF emissions, especially for frequencies above 100 MHz.

10 Claims, 7 Drawing Sheets

USING ELECTRICALLY LOSSY TRANSMISSION SYSTEMS TO REDUCE COMPUTER RF EMISSIONS

BACKGROUND OF THE INVENTION

The present invention relates to computers and, more particularly, to schemes for reducing RF emissions from computers. A major objective of the present invention is to provide for reduced RF emissions from computers.

Much of modern progress is associated with advances in computer technology that have led to the increasing prevalence of both general-purpose computers and special-purpose microprocessor-based products. A problem with such devices is that they can emit radio-frequency (RF) electromagnetic energy that can interfere with the operation of other devices that are located nearby.

Several approaches have been applied to reduce the emissions from a computer. One general design approach is to minimize the use of structures that are likely to emit RF energy. For example, structures that inadvertently act like antennas, transmission lines, and other transmission systems should be avoided. Transmission systems typically include two conductors spaced by dielectric material, typically air in a computer. The transmission system is typically elongated or otherwise dimensioned so that electrical energy can be propagated along it. Such structures, especially under resonant conditions, are likely sources of RF emissions. Avoiding unintended transmission systems thus can limit RF emissions. This structural approach is of course limited, since some required structures, like cables, have inherent transmission system characteristics.

Since some RF emissions are inevitable, shielding is generally arranged to prevent their escape from the computer. Surrounding RF-emitting elements with grounded metal shielding can be an effective approach to preventing RF emissions from escaping. Many computers are housed in metal cabinets. In addition, cables, both within a computer and extending out of a computer, can have metal shielding surrounding signal-bearing conductors. Long metal runs within PCB boards can be shielded by placing them between metal layers. Currents induced in the shielding remain associated with their producing signal-bearing conductors resulting in a minimization of fields that can escape the shield. The resonances that may be set up within the shielded environment and which could yield the strongest emissions are thus isolated from the outside world.

While shielding can be effective in principle, emissions can escape through breaches in the shielding. In general, RF energy can readily escape through breaches dimensionally comparable with the RF wavelengths. RF wavelenghts are inversely proportionally to RF frequencies and, thus, are becoming shorter as base clock speeds are increased. Some breaches are often required by design: e.g., slots for inserting devices and media, ventilation holes, and metal-to-metal contacts. Some breaches result from damage to shielding. For example, flexing cables during installation can breach cable shielding either at cable ends or along the cable length. In either case, the breaches can provide escape routes for RF energy.

The shortest wavelength RF emissions are often associated with harmonics over base frequencies. The harmonics are associated with frequencies that are multiples of the base frequencies, and have correspondingly shorter wavelengths. Filtering and other wave-shaping techniques can smooth sharp transitions to reduce the energy associated with high-frequency harmonics so that much of the RF energy is at longer wavelengths that are effectively blocked by the computer shielding.

However, to meet an incessant demand for higher performance, switching frequencies are increasing, e.g., well beyond 100 MHz, so that even RF energy associated with base frequencies can escape through conventionally dimensioned slots, holes, and vents. Thus, the basic transmission avoidance, shielding, and filtering approaches must be supplemented.

In the case of cables, ferrite material can be applied to external cables and to internal cables where they interface with a PCB board. Current-carrying cables generate magnetic fields. The ferrite material operates on these magnetic fields, attenuating the energy by magnetic field loss. The ferrites, however, are bulky and inflexible, and thus inconvenient where space is at a premium—as is often the case near the signal source. Furthermore, optimum performance may require precise positioning, which can be difficult to guarantee, especially where the computer interior is user accessible. Even with precise positioning, certain frequencies may not be attenuated. For example, the effectiveness of ferrite modules generally drops off above 500 MHz.

In summary, the structural-design, shielding, filtering, and magnetic-field attenuating approaches can be used in combination to greatly reduce RF emissions from computer systems. However, the collective effectiveness of these approaches can still be inadequate, especially, with unwanted RF emissions approaching and exceeding one gigahertz. What is needed is another approach to reducing RF emissions, especially, at frequencies from 100 MHz to 1 GHz and beyond.

SUMMARY OF THE INVENTION

The present invention, in a sense, opposes the prior-art approach of reducing RF emissions by avoiding transmission systems. The present invention encourages the use of transmission systems for use in reducing RF energy. However, where the prior art used non-lossy transmission systems by default, the present invention calls for electrically lossy transmission systems to dissipate RF energy.

An electrically lossy transmission system can include two conductors separated by electrically lossy dielectric material. Herein, "electrically lossy" requires an electrical loss tangent (dissipative factor) of at least 0.1 for 100 MHz waveforms. Preferably, the electrical loss tangent is greater than the magnetic loss tangent for the material. At least one of the conductors serves as a return path for RF current in the other conductor. The invention provides for including electrically lossy dielectric material between existing conductors that might act as transmission lines, and for disposing metal-backed electrically lossy dielectric adjacent to conductors to define an incorporating electrically lossy transmission system.

The transmission system should extend at least four times the conductor spacing, which should be no more than about 1 centimeters (cm) apart. The space between the conductors should be substantially (at least 90% of the separation) filled with dielectric material. Preferably, the dielectric material is in contact with both conductors. While the space between the conductors is preferably filled entirely with electrically lossy dielectric, some thickness of dielectric can be non lossy. For example, a composite dielectric structure can result when electrically lossy dielectric is disposed on a conductor which has a non-lossy dielectric protective coating in place. When not all of the dielectric is lossy, it is preferable that the lossy dielectric occupy a relatively large portion of the distance between the conductors and have a relatively low dielectric constant (compared to the non-lossy dielectric) so that most of the voltage drop between the conductors occurs within the lossy dielectric.

The electrically lossy dielectric can be a flexible dielectric material (plastic, rubber, or foam) for good conformance to conductive surfaces to which it may be applied. The electrically lossy character of the dielectric can be achieved by a colloidal resistive graphite particles dispersed throughout the dielectric. The dispersion can be uniform or non-uniform. In the later case, the density of the graphite particles can vary transversely between the conductors or longitudinally along the conductors. In the latter case, the corresponding changes in impedance along a transmission path can result in multiple reflections, each of which results in additional dissipation of unwanted RF energy. Such enhanced dissipation can also be achieved by varying the dielectric thickness or the dielectric constant longitudinally.

This invention provides for dissipating unwanted RF energy by operating on its electric field. In general, propagating RF energy establishes maximum voltage standing waves on all metallic elements when these elements have dimensions of one-quarter wavelength or multiples thereof and with ends that are not terminated in the characteristic impedance of the propagating energy. It is these critical dimensions that offer the optimum potential for standing-wave generation between the transmission elements. These standing waves provide the opportunity of dissipating all the propagating energy.

Preferably, at least one metal element is closely coupled to the source of the unwanted energy. At least one other metal element provides a local return path for the RF originating energy. For optimum results, the electrically lossy material should have bulk resistivity and a dielectric constant optimized to provide the largest voltage drop across it when located intimately between the metal elements acting as the transmission system. The material need not actually contact a metal element if there is an adequate dielectric material over the metal that provides for minimizing the voltage drop across it compared to that across the electrically lossy structure.

The electrically lossy transmission systems dissipate RF energy, so there is less RF energy available to be emitted. The invention shares this advantage with the dissipation of magnetic fields approach. The latter has the advantage of not relying on adjacent metal structures or adding metal to achieve RF dissipation.

On the other hand, the present invention provides for materials that are more economical, more flexible, and more readily adapted to the computer environment. Electrically lossy materials can be based on graphite, which is much less expensive than the ferrite used for magnetically lossy materials. The electrically lossy material can be readily fabricated in sheets, so that they can be readily applied to planar surfaces within a computer. Also, available electrically lossy dielectrics are compressible, so that can be press fitted to target conductors to ensure good contact. In the case of flat surfaces, it can be difficult to apply an effective magnetic loss medium (which should surround any currents), but it is relatively easy to apply a flat sheet of electrically lossy material.

While the electrically lossy dielectric and the metal-plus-lossy-dielectric can be applied on an ad hoc basis, the invention provides for more optimal RF emission reductions where a computer is designed from the ground up to include electrically lossy transmission systems. In any event, the invention can be used effectively with other RF reduction methods including the use of magnetic lossy materials, structural shielding, and waveshaping. These and other features and advantages of the invention are apparent from the description below with reference to the following drawings.

In the figures, solid hatching indicates metal, "unspeckled" alternate solid and dashed hatching indicates non-electrically lossy dielectric, and "speckled" alternative solid and dashed hatching indicates electrically lossy dielectric.

DESCRIPTION OF THE PREFERRED EMBODIMENTS

Figure 1:
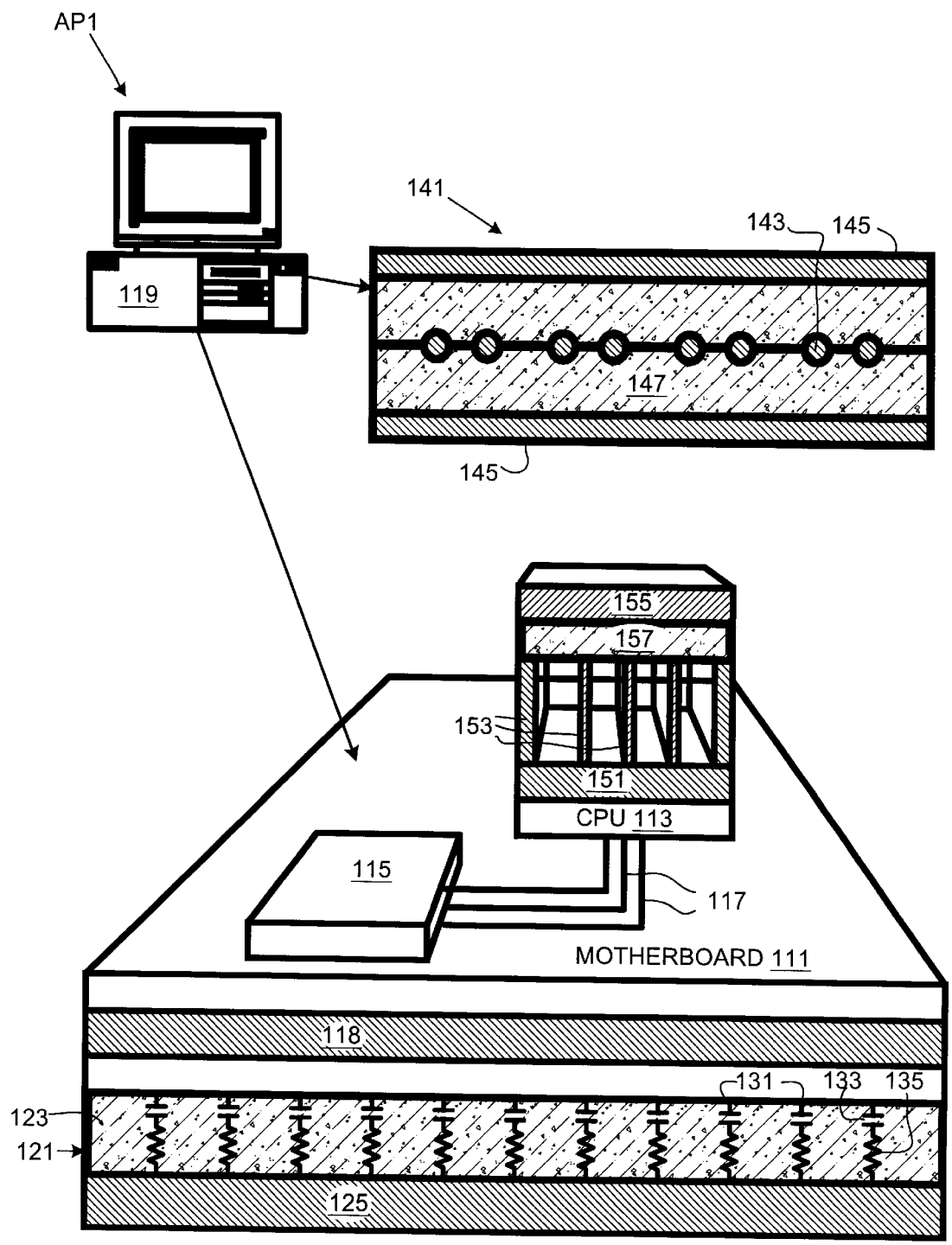
FIG. 1 is a schematic illustration of a computer system incorporating the present invention.

In accordance with the present invention, a computer AP1, shown in FIG. 1, provides for dissipating RF emissions in electrically lossy transmission systems. Each transmission system includes at least two conductors separated by an electrically lossy dielectric, Eccosorb QR-12 which has colloidal graphite dispersed in a polymer matrix.

For example, computer AP1 has a motherboard 111 that carries several integrated circuits, including a central processing unit (CPU) 113, and a memory circuit 115. CPU 113 and memory circuit 115 are coupled through conductors 117 which are traces on motherboard 111. Signals through conductors 117 are referenced to a ground plane 118 embedded in motherboard 111. The signals through conductors 117 are intended to carry signals with frequencies of up to 200 MHz. These can induce unwanted common-mode noise in ground plane 118. This common-mode noise can contribute to RF emissions that could escape through breaches in computer housing 119 or via cabling attached to the motherboard and exiting the computer.

To dissipate energy associated with these higher frequencies, a transmission system 121 is defined using ground plane 118, an electrically lossy dielectric 123, and a metal layer 125. In this part of FIG. 1, the lossy characteristic of the dielectric 123 is suggested by a longitudinal series of parallel electrical paths 131, each path 131 including a capacitor 133 and a resistor 135 in series. This path representation approximates the electrical characteristics of transmission system 121 at radio frequencies.

Computer AP1 includes many cables, including a ribbon cable 141 with signal-plus-circuit-ground pairs of conductors 143. Metal layers 145 are arranged generally parallel to conductors 143. The volume between the metal layers is filled with an electrically lossy dielectric 147. Cable 141 defines a lossy transmission system. Strong coupling between the signal and ground conductors for each pair preserve the intended high-frequency components of the signals. However, commnon-mode high-frequency components are dissipated due to the lossy character of cable 141. Note that cable 141, as other cables disclosed herein with an outer metal shielding, can be coated with insulation to prevent inadvertent shorting.

A heat sink 151 is used to remove heat from CPU 113. Heat sink 151 is metal and, though not intended as a signal path, can propagate and radiate RF signals. In particular, heat sink 151 includes parallel cooling fins 153. Edges of adjacent pairs of cooling fins can act as radiating transmission lines. A metal layer 155 is disposed parallel to the top edges of the fins, separated by electrically lossy dielectric 157. Thus, heat sink 151 is part of a lossy transmission system so that RF energy is dissipated. The RF energy that is dissipated is, of course, eliminated as a source of unwanted RF emissions.

Figure 2:
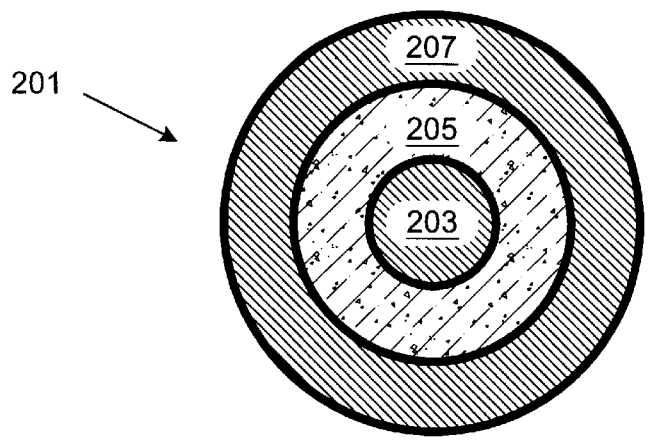
FIG. 2 is a cross section of a first cable incorporating the present invention.

A cable 201 in accordance with the present invention comprises a core conductor 203, electrically lossy dielectric 205, and an outer conductor 207, as shown in FIG. 2. Cable 201 is designed for carrying constant voltages or low frequency signals. Lossy dielectric 205 dissipates the high-frequency noise along cable 201. In this case, core conductor 203 and outer conductor 207 define a transmission system, which is made lossy by the presence of lossy dielectric 205. Cable 201 is not well suited to carrying high-frequency signals except over lengths and conditions under which the concomitant attenuation can be tolerated.

Figure 3:
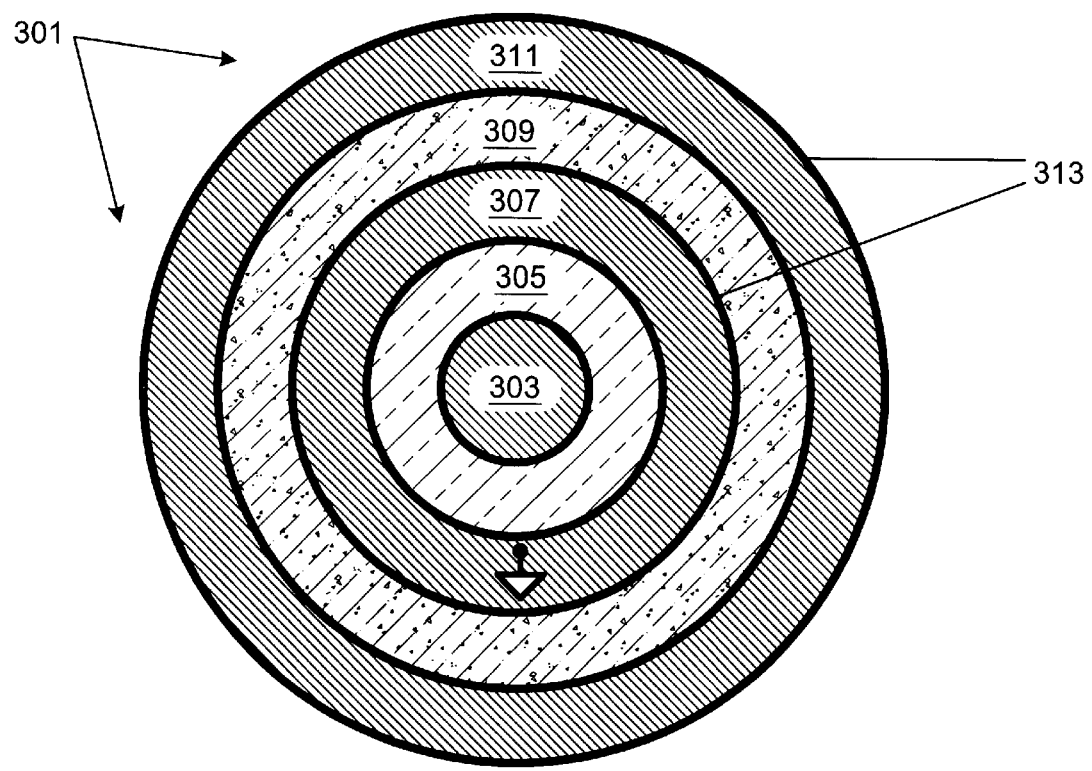
FIG. 3 is a cross section of a second cable incorporating the present invention.

A high-frequency capable cable 301 is shown in FIG. 3 comprising a core conductor 303, a non-lossy inner dielectric 305, an inner shield 307, an electrically lossy outer dielectric 309, and an outer shield 311. Inner shield 307 is coupled to circuit ground.

In this case, the lossy transmission system 313 of interest includes the two shields 307 and 311 and outer lossy dielectric 309. This lossy transmission system 313 dissipates common-mode signals on the inner shield 307. While cable 301 is shown with a single-conductor core, the invention can be applied regardless of the number of conductors enclosed by the inner shield.

Figure 4:
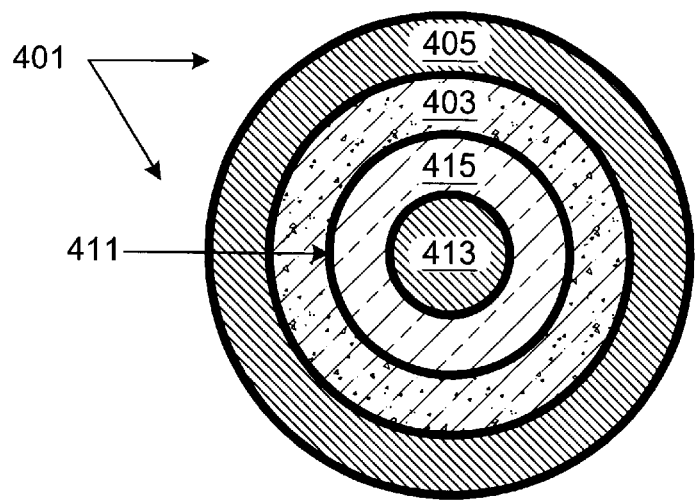
FIG. 4 is a cross section of a third cable incorporating the present invention.

The present invention can be applied to coated cables without removing the coating. For example, cable 401 of FIG. 4 is achieved by adding an electrically lossy dielectric 403 and an outer shield 405 to an inner cable 411. Inner cable 411 includes a core conductor 413 and a non-lossy inner dielectric 415. Cable 401 is less favored than cable 201 of FIG. 2, but may provide advantages in terms of cost and convenience for cables with preexisting non-lossy coatings. In this case, it is preferred that the lossy dielectric be relatively thick and have a relatively low dielectric constant so that most of the voltage drop between conductors occurs in lossy dielectric 403.

Figure 5:
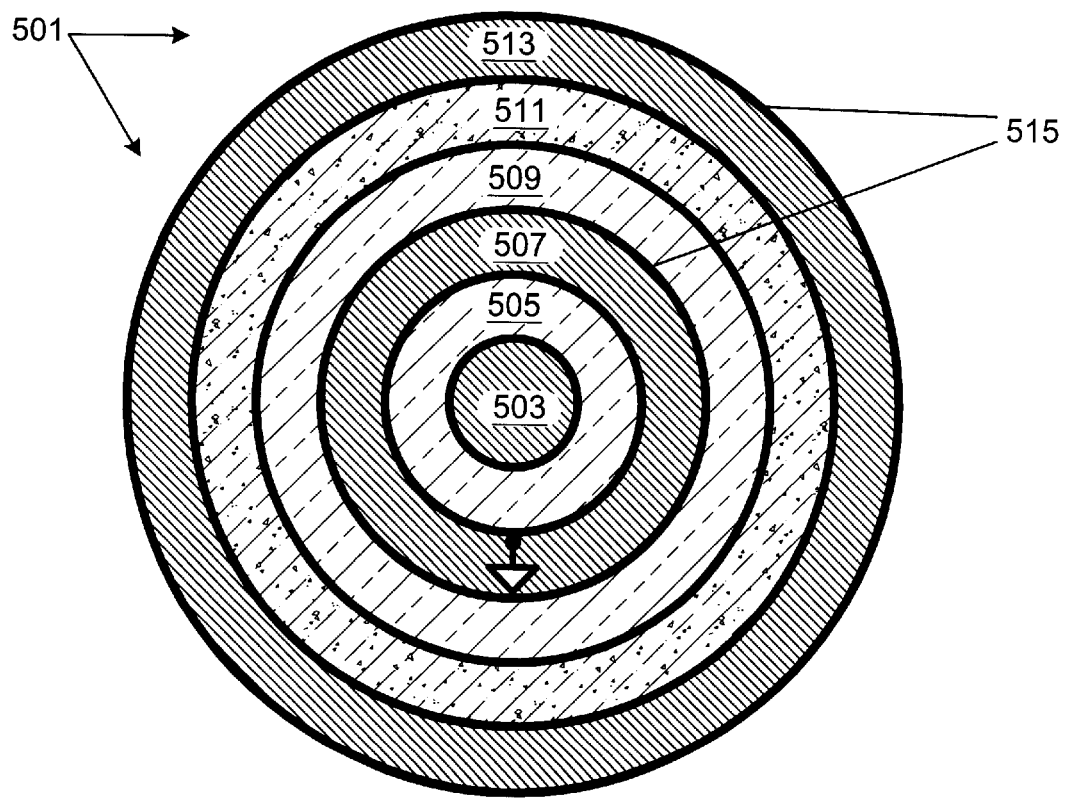
FIG. 5 is a cross section of a fourth cable incorporating the present invention.

Cable 501 of FIG. 5 incorporates the modification discussed in relation to FIG. 4 but in relation to a coated and shielded cable. In this case, the pre-existing cable comprises a core conductor 503, a non-lossy inner dielectric 505, inner shielding 507, and a non-lossy outer dielectric 509. The original cable is made to incorporate the present invention by the addition of lossy dielectric 511 and outer shielding 513. This defines a transmission system 515 comprising shieldings 507 and 513 and non-lossy dielectric 509 and lossy dielectric 511. Once again, the presence of non-lossy dielectric does not preclude RF dissipation. However, it is still preferred that most of the voltage drop between shieldings 507 and 513 occur within lossy dielectric 511.

Figure 6:
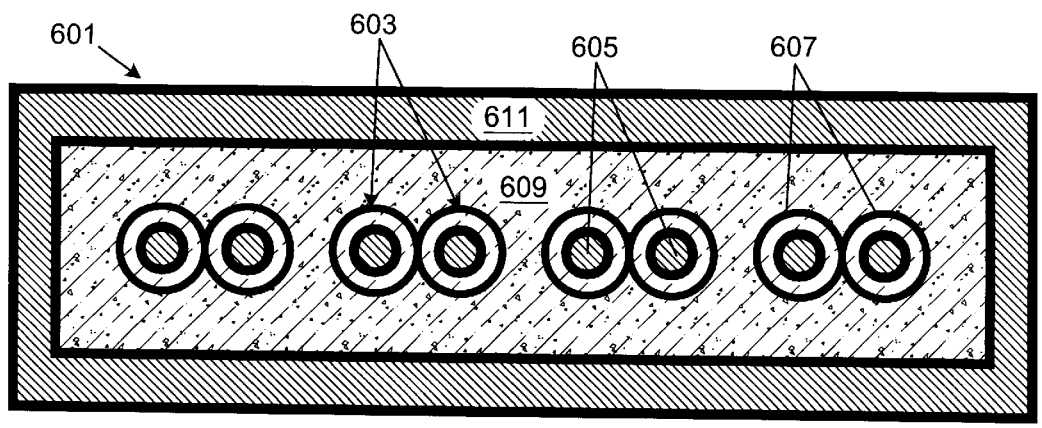
FIG. 6 is a cross section of a fifth cable incorporating the present invention.

A parallel cable 601 of FIG. 6 comprises eight wires 603 arranged in signal-return pairs. Each wire 603 includes a conductor 605 and a non-lossy dielectric coating 607. For each signal-return pair, the coatings 607 contact each other; otherwise, the wires are separated and surrounded by lossy dielectric 609, which in turn is surrounded by an outer shield 611. Each signal/return pair forms a relatively non-lossy transmission system. In addition, each signal/return pair collectively forms a lossy transmission system in combination with outer shield 611 so that common mode noise is dissipated by lossy dielectric 609.

Figure 7:
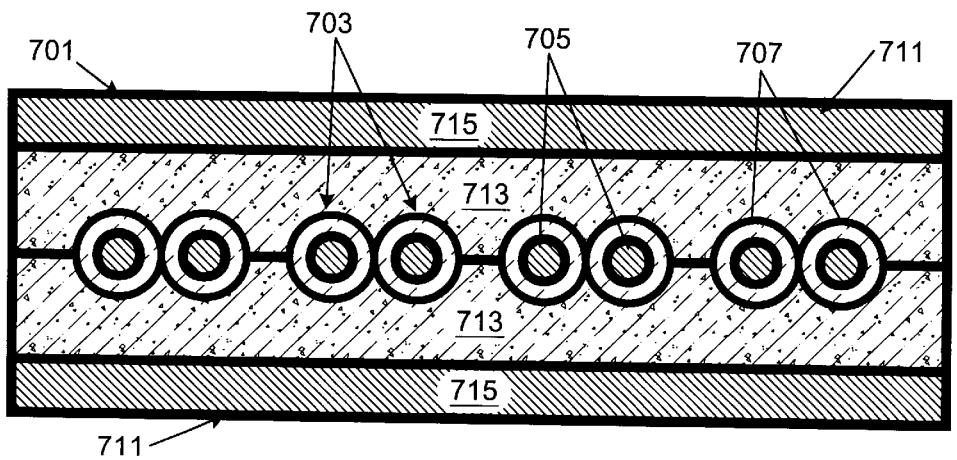
FIG. 7 is a cross section of a sixth cable incorporating the present invention.

A second parallel cable 701, shown in FIG. 7, similarly comprises eight wires 703 arranged in signal/return pairs, with each wire 703 having a conductor 705 and a dielectric coating 707. Wires 701 are sandwiched between two composite structures 711 of metal-backed lossy dielectric. Thus, each composite structure 711 includes a lossy dielectric layer 713 disposed against wires 703 and a metal layer 715 disposed on the respective lossy dielectric layer 713. Lossy dielectric layers 713 are flexible so that they conform to wires 703 when applied with pressure. Dielectric adhesive can be used to bind lossy-dielectric 713 to wire coatings 707. While wires 703 are not completely surrounded by shielding, as is the case with cable 601 of FIG. 6, comparable energy dissipation is achieved as most of the electric field lines emanating from wires 701 are drawn into metal layers 715. Preferably, metal layers 715 extend laterally beyond the wires at least their distance from wires 703.

Figure 8:
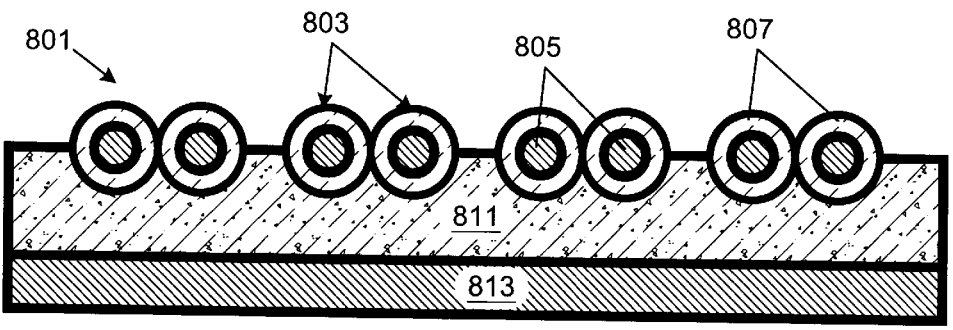
FIG. 8 is a cross section of a seventh cable incorporating the present invention.

A third ribbon cable 801, shown in FIG. 8, also includes eight wires 803 arranged in four signal/return pairs, with each wire including a conductor 805 and dielectric insulation 807. In this case, lossy dielectric 811 is pressed against and bonded to wires 803, but only one metal layer 813 is applied. While the one-sided shielding provided by cable 801 is less effective that the two sided shielding of cable 701 and the surround shielding of cable 601, the RF dissipation provided by these three cables is comparable.

Figure 9:
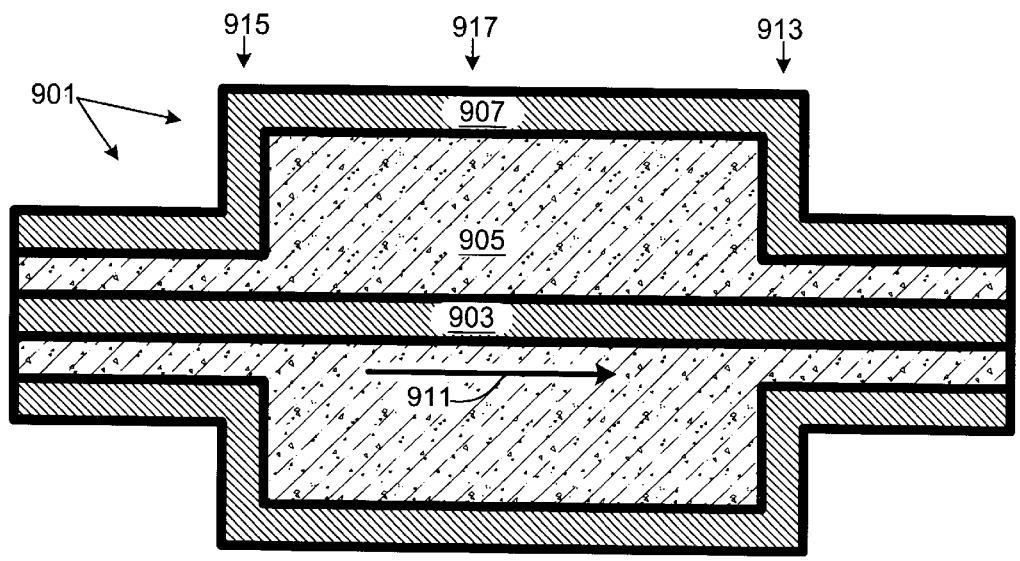
FIG. 9 is a side sectional view of a cable similar to that of FIG. 2, but for which cable thickness is varied so that RF energy is reflected back and forth.

A cable 901 of varying thickness is shown in FIG. 9 comprising a conductor 903, lossy dielectric 905, and a shield 907, so as to define a transmission system. The impedance of cable 901 varies abruptly where its thickness changes. More specifically, the impedance is higher where cable 901 is thicker and lower where cable 901 is thinner.

A signal in the position of arrow 911 propagating in the direction of arrow 911 encounters a high-to-low impedance mismatch at cable-width transition 913. This induces a reflection that opposes arrow 911. The reflection encounters a high-to-low impedance mismatch at cable-width transition 915, causing a second reflection. The original signal as well as its reflections all suffer energy loss in view of the lossy transmission-line structure. Thus, impedance mismatching can be used to induce repeated energy dissipation. However, for lower frequency signals with wavelengths more than four times the length of thick region 917 of cable 901, there is relatively little attenuation.

Cable 901 is designed to filter high-frequency noise from a low-frequency signal. However, a modified design in which conductor 903 is replaced by a shielded cable with one or more conductors can be used for rejecting common-mode noise from high-frequency signals riding on the shield.

Figure 10:
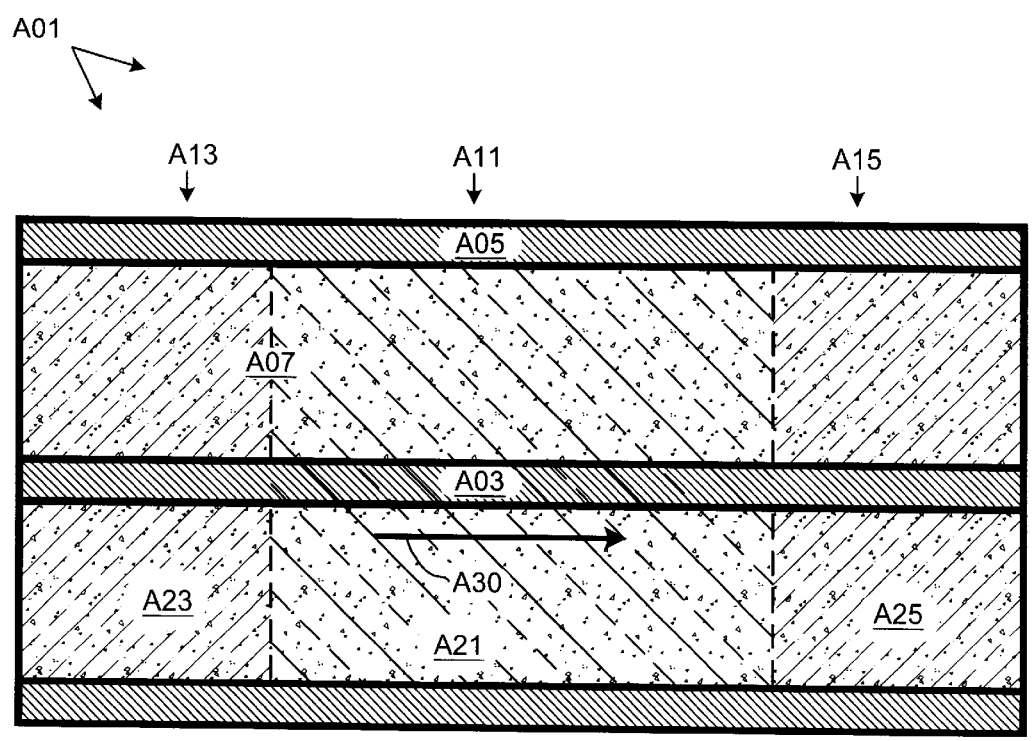
FIG. 10 is a side sectional view of a cable similar to that of FIG. 2 but for which the loss tangent of the electrically lossy dielectric is varied longitudinally so that RF energy is reflected back and forth.

Cable A01 provides for reflections using impedance mismatches as shown in FIG. 10. Cable A01 includes an inner conductor A03, an outer conductor A05, and intermediate electrically lossy dielectric A07. Cable A01 includes a relatively high impedance center section A11, and relatively low impedance sections A13 and A15 to either side. The impedance of center section A11 is slightly more than twice that of low impedance sections A13 and A15.

Correspondingly, there are three sections of dielectric A14, namely, a center section A21 and two outer sections A23 and A25. To achieve the specified impedance profile, the density of electrically lossy material (e.g., graphite) is lower in center section A21 than in outer sections A23 and A25. A signal traveling in the position and direction indicated by arrow A30 yields repeated reflections, which in turn result in RF energy loss, much as described with respect to cable 901 of FIG. 9. An alternative cable achieves similarly repeated reflections by longitudinally varying the dielectric constant of the lossy dielectric.

Figure 11:
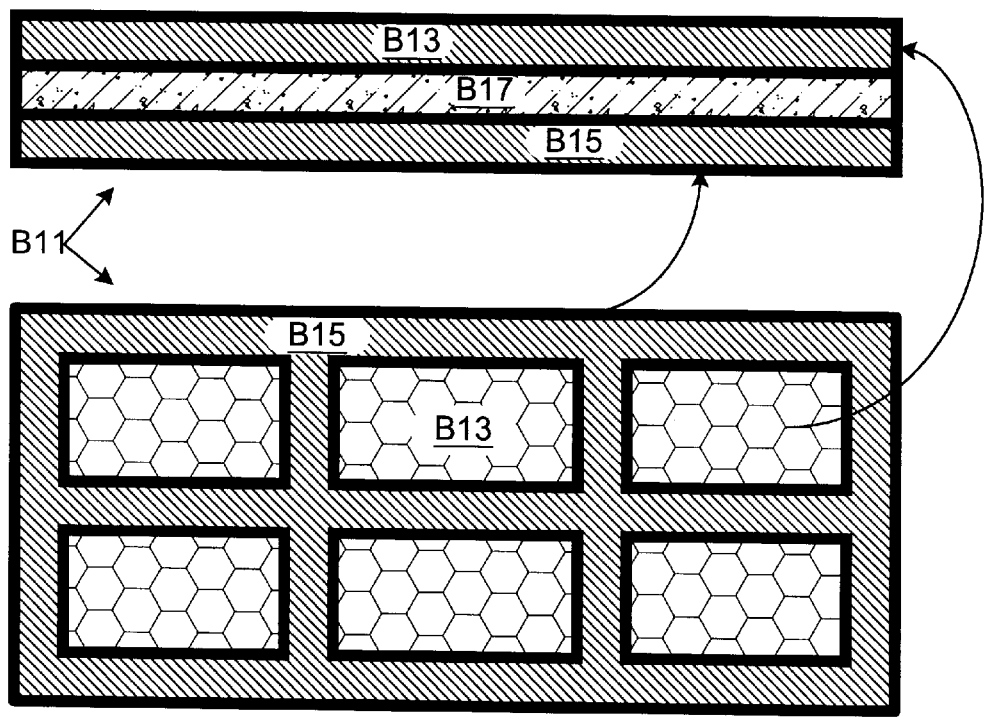
FIG. 11 is a schematic illustration of a vent of the computer system of FIG. 1 and incorporating the present invention.

A vent B11 for computer AP1 (FIG. 1) is shown in FIG. 11 comprising a honeycomb grill B13, a grounded metal structure B15, and an intermediate lossy dielectric B17. Vent B11 is designed to permit air circulation, while minimizing RF emissions from grill B13.

While specific applications of the invention are discussed above, it can be understood that the invention applies quite generally. For example, transmission lines created incidentally can be filled with lossy-dielectric to dissipate RF energy. Metal surfaces can be contacted with metal backed lossy dielectric to form lossy transmission lines.

Anti-static foam often used for packaging integrated circuit is a suitable electrically lossy material. The invention provides for application of electrically lossy material to metal surfaces by methods of spraying, squeezing, dipping, etc. Metal elements prepared in such a manner may then be simply moved into contact with the other elements in the pseudo-transmission system. Laminates including appropriate metallic elements and electrically lossy material may also be manufactured. The electrically lossy material may also be applied as a separate element when conditions warrant.

A test was performed using Emerson & Cumming Eccosorb QR-12 serving as an electrically lossy dielectric. This material has an electrical loss tangent of 0.4 at 100 MHz, and a relative dielectric constant of 5.4. The magnetic loss tangent for Eccosorb QR-12 is basically zero and in any event considerably less than its electrical loss tangent.

In the test, the material was located between the bottom of a PCB and an underlying metal mounting part in a computer product. The application of this material allowed reduction of radiated emissions as great as 10 dB in frequencies above 200 MHz. Other applications of this material located between microprocessor heat sinks and a surrounding air duct also provided significant reductions in radiated emissions Two cases were also simulated. The first case involved a 0.125"-thick layer of Eccosorb QR-12 applied between a ground plane and a signal line that was 0.5" wide, 0.05" thick, and 10" long. This transmission system yields a 1.9 dB loss at 100 MHz, and an 18 dB loss at 1 GHz.

The second case involved 0.125"-thick layers of Eccosorb QR-12 applied to either side of a central conductor in a stripline that is 0.5" wide, 0.05" thick, and 10" long (the same dimensions as in the second test). The result is a 2.2 dB loss at 100 MHz, and a 22 dB loss at 1 GHz.

Furthermore, the invention calls for new design considerations. Whereas, the prior art might tend to avoid forming transmission lines, since these readily emit RF signals, the present invention encourages their use. The more conductors and structural metal can be arranged to define transmission lines, the more opportunity exists for dissipating RF energy. The intermediate space is filled with electrically lossy dielectric. The result is computer systems that dissipate much of the unwanted RF energy so that it is not available to generate RF emissions. These and other variations upon and modifications to the described embodiments are provided for by the present invention, the scope of which is defined by the following claims.

What is claimed is:

1. A method of reducing RF energy emissions from a computer, said method comprising disposing a layered structure having a metal layer and an electrically lossy dielectric layer in contact with a conductor or in contact with a dielectric that is in contact with said conductor so as to form an electrically lossy transmission system having a voltage drop associated with an RF signal propagating along said transmission system and occurring between said metal layer and said conductor, at least half of said voltage drop occurring within said electrically lossy dielectric layer.

2. A method of reducing RF energy emissions from a computer, said method comprising disposing a layered structure having a metal layer and an electrically lossy dielectric layer in contact with a conductor or in contact with a dielectric that is in contact with said conductor so as to form an electrically lossy transmission system said electrically lossy dielectric layer having an electrical loss tangent at 100 MHz and a magnetic loss tangent at 100 MHz, said electrical loss tangent being greater than said magnetic loss tangent.

3. In a computer system, a transmission system comprising:
   a first conductor;
   a second conductor extending parallel to said first conductor within one centimeter thereof; and
   dielectric material extending between said conductor and said metal layer, at least some thickness of said dielectric material having dispersed therein electrically lossy particles so that at least half of a voltage drop between said first and second conductor occurs across said electrically lossy particles.

4. In a computer system, a transmission system comprising:
   a first conductor;
   a second conductor extending parallel to said first conductor within one centimeter thereof; and
   dielectric material extending between said conductor and said metal layer, at least some thickness of said dielectric material being of electrically lossy dielectric material having an electrical loss tangent at 100 MHz and a magnetic loss tangent at 100 MHz, said electrical loss tangent being greater than said magnetic loss tangent.

5. A computer cable comprising:
   a first longitudinally extending conductor;
   a metal layer spaced by no more than one centimeter from said longitudinally extending conductor; and
   a first dielectric material extending transversely from said metal layer to said first conductor, at least some thickness of said first dielectric material being an electrically lossy dielectric; and a second conductor and a second dielectric, said second dielectric spacing said first conductor and said second conductor, said second dielectric being a non-electrically-lossy dielectric.

6. A computer cable as recited in claim 5 wherein said first conductor surrounds said second conductor to define a coaxial cable, said first conductor being located radially between said metal layer and said second conductor.

7. A computer cable comprising:

at least a first longitudinally extending conductor coupled to a signal source so as to define a direction of signal propagation therealong;

a metal layer spaced by no more than one centimeter from said longitudinally extending conductor; and a first dielectric material extending transversely from said metal layer to said first conductor, at least some thickness of said first dielectric material being an electrically lossy dielectric;

wherein an impedance between said metal layer and said first conductor diminishes abruptly at a first longitudinal position by a factor of at least one half in said direction of signal propagation.

8. A computer cable as recited in claim 7 wherein the impedance between said metal layer and said first conductor increases abruptly at a second longitudinal position by a factor of at least two, said second longitudinal position being closer to said signal source than is said first longitudinal position.

9. A computer cable comprising:

at least a first longitudinally extending conductor;

a metal layer spaced by no more than one centimeter from said longitudinally extending conductor; and a first dielectric material extending transversely from said metal layer to said first conductor, at least some thickness of said first dielectric material being an electrically lossy dielectric having an electrical loss tangent at 100 MHz and a magnetic loss tangent at 100 MHz, said electrical loss tangent being greater than said magnetic loss tangent.

10. A computer system comprising:

a computer housing;

a data processor;

memory;

signal lines coupling said data processor and said memory;

a first conductor coupled to said signal lines so that RF noise is induced in said first conductor by signals in said signal lines;

a second conductor extending parallel to said first conductor within one centimeter thereof; and dielectric material extending between said conductor and said second conductor, at least some thickness of said dielectric material being of electrically lossy dielectric material;

said data processor, said memory, said signal lines, said first conductor, said second conductor, and said dielectric material being within said computer housing.

* * * * *